(12) United States Patent
Berkowitz

(10) Patent No.: US 12,523,843 B2
(45) Date of Patent: Jan. 13, 2026

(54) INTERNALLY SLOTTED CAM FOR LENS SYSTEM

(71) Applicant: Panavision International, L.P., Woodland Hills, CA (US)

(72) Inventor: Scott Jason Berkowitz, Tujunga, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

(21) Appl. No.: 18/657,514

(22) Filed: May 7, 2024

(65) Prior Publication Data

US 2025/0013005 A1    Jan. 9, 2025

Related U.S. Application Data

(63) Continuation of application No. 17/852,064, filed on Jun. 28, 2022, now Pat. No. 11,977,271, which is a continuation of application No. 16/989,798, filed on Aug. 10, 2020, now Pat. No. 11,372,197, which is a continuation of application No. 15/901,680, filed on Feb. 21, 2018, now Pat. No. 10,739,552.

(51) Int. Cl.
   *G02B 7/10* (2021.01)
   *G02B 13/08* (2006.01)
   *G03B 17/56* (2021.01)

(52) U.S. Cl.
   CPC ............. *G02B 7/10* (2013.01); *G02B 7/102* (2013.01); *G02B 13/08* (2013.01); *G03B 17/565* (2013.01)

(58) Field of Classification Search
   None
   See application file for complete search history.

(56) References Cited

U.S. PATENT DOCUMENTS

| | | | |
|---|---|---|---|
| 3,058,391 A | 10/1962 | Leupold | |
| 3,822,932 A | 7/1974 | Humphrey | |
| 4,241,982 A * | 12/1980 | Uesugi | G02B 7/10 359/823 |
| 5,953,546 A * | 9/1999 | Okada | H04N 23/531 396/386 |
| 2004/0165876 A1 * | 8/2004 | Yasuda | G02B 7/10 396/84 |
| 2011/0149420 A1 | 6/2011 | Fukino | |

FOREIGN PATENT DOCUMENTS

| | | |
|---|---|---|
| JP | S5559410 A | 5/1980 |
| JP | S61034116 U1 | 3/1986 |
| JP | S62201409 A | 9/1987 |
| JP | H01277811 A | 11/1989 |

(Continued)

OTHER PUBLICATIONS

Non-Final Office Action issued Nov. 27, 2019 in corresponding U.S. Appl. No. 15/901,680, filed Feb. 21, 2018; total 10 pages.

(Continued)

*Primary Examiner* — Robert E. Tallman
(74) *Attorney, Agent, or Firm* — Snell & Wilmer L.L.P.

(57) ABSTRACT

A cam for applying movement to a lens system. The cam may include a body configured to couple to the lens system. The body may have slots s that are configured to receive lens followers. The slots may extend in directions that are convergent relative to each other.

20 Claims, 10 Drawing Sheets

(56) References Cited

FOREIGN PATENT DOCUMENTS

| | | |
|---|---|---|
| JP | 2008026827 A | 2/2008 |
| JP | 2008072337 A | 3/2008 |
| TW | 200919210 A | 5/2009 |
| WO | 2012037201 A2 | 3/2012 |

OTHER PUBLICATIONS

Notice of Allowance issued Apr. 8, 2020 in corresponding U.S. Appl. No. 15/901,680, filed Feb. 21, 2018; total 7 pages.
International Search Report dated Jul. 19, 2019 in corresponding International Application No. PCT/US2019/018843 filed Feb. 20, 2019; total 5 pages.
Written Opinion of the International Searching Authority dated Jul. 19, 2019 in corresponding International Application No. PCT/US2019/018843 filed Feb. 20, 2019; total 8 pages.
International Preliminary Report on Patentability dated Aug. 27, 2020 in corresponding International Application No. PCT/US2019/018843 filed Feb. 20, 2019; total 9 pages.
Non-Final Office Action dated Aug. 30, 2021 in corresponding U.S. Appl. No. 16/989,798, filed Aug. 20, 2020; total 12 pages.
Notice of Allowance dated Feb. 25, 2022 in corresponding U.S. Appl. No. 16/989,798, filed Aug. 20, 2020; total 7 pages.
Non-Final Office Action dated Aug. 17, 2023 in corresponding U.S. Appl. No. 17/852,064, filed Jun. 28, 2022; total 7 pages.
Notice of Allowance dated Jan. 4, 2024 in corresponding U.S. Appl. No. 17/852,064, filed Jun. 28, 2022; total 7 pages.

* cited by examiner

INTERNALLY SLOTTED CAM FOR LENS SYSTEM

CROSS-REFERENCE TO RELATED APPLICATIONS

This patent application is a continuation of U.S. patent application Ser. No. 17/852,064 filed Jun. 28, 2022, now U.S. Pat. No. 11,977,271, which is a continuation of U.S. application Ser. No. 16/989,798 filed Aug. 10, 2020, now U.S. Pat. No. 11,372,197, which is a continuation of U.S. patent application Ser. No. 15/901,680 filed Feb. 21, 2018, now U.S. Pat. No. 10,739,552, which applications are hereby incorporated by reference in their entireties.

BACKGROUND

Anamorphic cinematography lenses inherently have various amounts of astigmatism that must be corrected to create a sharp image. Methods of correction include use of two lenses to reduce astigmatism. The lenses are rotated to reduce the astigmatism.

Anamorphic cinematography lenses inherently have various amounts of astigmatism that must be corrected to create a sharp image. Methods of correction include use of two lenses to reduce astigmatism. The lenses are rotated to reduce the astigmatism.

Methods to rotate the lenses include a gear or cam to rotate the lenses. Using the gear method, the movement of the system is limited to a linear progression and does not achieve the most accurate results. The cam method relies on the use of return springs for one direction of rotation. The cam method lacks reliability because, due to environmental changes, the springs do not always have enough strength to overcome the resistance from the optical housings being driven and often fail. Further, springs may weaken over time and screws that attach the springs to the housings could loosen or back out. This method may also cause an inconsistent feel for the user due to increased spring tension at closer focus distances. Further, the close focus range is limited due to geometrical limitations of the system.

SUMMARY

Apparatuses, systems, and methods disclosed herein are directed to improving a cam system. Embodiments disclosed herein utilize slots in a cam body that may eliminate the need for return springs. A more consistent focus feel may be provided for the user.

An embodiment disclosed herein includes a cam for applying movement to a lens system. The cam comprises a body configured to couple to the lens system and having a first slot and a second slot, the first slot configured to receive a first lens follower, the second slot configured to receive a second lens follower, the first slot and the second slot extending in directions that are convergent relative to each other.

An embodiment disclosed herein includes a lens system comprising a first lens, a second lens, and a cam. The cam includes a first slot and a second slot, the first slot configured to couple to the first lens and the second slot configured to couple to the second lens such that axial movement of the cam causes the first lens and the second lens to rotate in opposite directions from each other.

An embodiment disclosed herein includes a method comprising providing axial movement of a cam to rotate a first lens and a second lens in opposite directions from each other. The cam may include a first slot and a second slot, the first slot being coupled to the first lens and the second slot being coupled to the second lens.

As digital technology evolves the need for higher quality lenses to match larger sensor are in great demand. An object of the disclosure is to provide a drive cam to operate a counter rotating lens system that achieves a higher level of precision than was possible with previous designs. An object of the disclosure is to provide a cam that reduces the need for return springs, so that the system is more robust and reliable. An object of the disclosure is to achieve a shorter close focus distance than was previously possible with a spring system. An object of the disclosure is to provide a cam that reduces resistance to a lens system and may achieve a smooth consistent feel throughout an entire focus range.

BRIEF DESCRIPTION OF THE DRAWINGS

Features and advantages of the systems, apparatuses, and methods as disclosed herein will become appreciated as the same become better understood with reference to the specification, claims, and appended drawings wherein:

DETAILED DESCRIPTION

Figure 1:
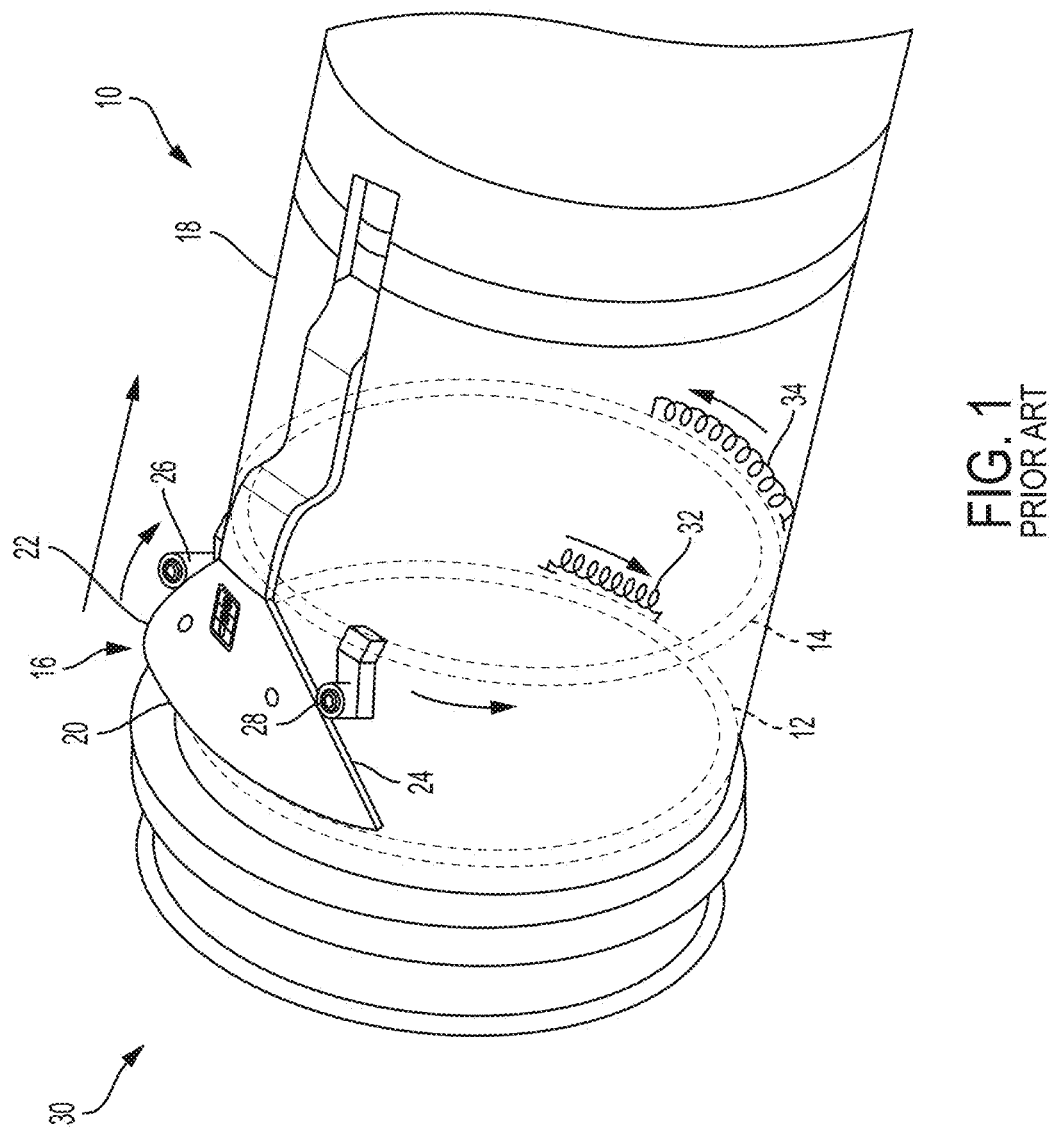
FIG. 1 illustrates a perspective view of a prior art lens system.

FIG. 1 illustrates a prior art embodiment of a lens system 10. The lens system 10 includes lenses 12, 14 and a cam 16. The lenses 12, 14 and cam 16 are coupled to a housing 18 of the lens system 10.

The lens system 10 is an anamorphic lens system, and the lenses 12, 14 are each cylindrical lenses. The anamorphic lens system is designed to counter-rotate the lenses 12, 14 during focusing, to reduce optical aberrations, and particularly reduce astigmatism caused by the anamorphic lens system during focusing.

The cam 16 includes a body 20 with working cam surfaces 22, 24. The working cam surfaces 22, 24 are configured to contact respective lens followers 26, 28 that are each coupled to respective lenses 12, 14.

The cam 16 is configured to move axially, along the optical axis. The axial movement corresponds to a focusing operation of the lens system 10. Upon the cam 16 being moved axially in a direction away from the object space 30 (the space containing the objects or areas to be imaged), the working cam surfaces 22, 24 press against the respective lens followers 26, 28. The forces against the lens followers 26, 28 rotate the lenses 12, 14 in opposite directions. The counter-rotation of the lenses 12, 14 reduces optical aberrations during focusing.

Springs 32, 34 are coupled to respective lenses 12, 14. The respective springs 32, 34 apply a force to the lenses 12, 14 in an opposite direction than the force applied by the working cam surfaces 22, 24. FIG. 1 illustrates the springs 32, 34 stretching as the cam 16 moves axially to rotate the lenses 12, 14.

Figure 2:
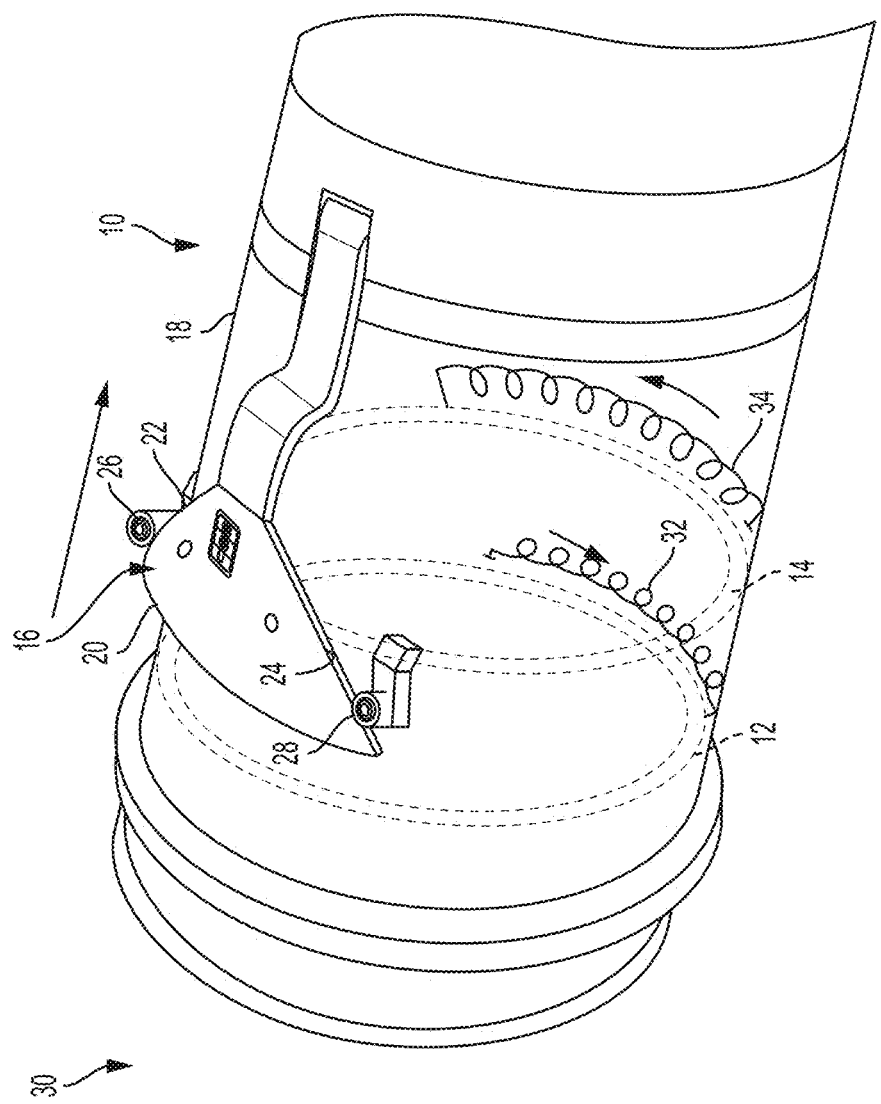
FIG. 2 illustrates a perspective view of the prior art lens system shown in FIG. 1 with the lenses rotated from the position shown in FIG. 1.

FIG. 2 illustrates the prior art embodiment of the lens system 10 in which the cam 16 has moved to its maximum axial position. The working cam surfaces 22, 24 have pressed the respective lens followers 26, 28 such that the lenses 12, 14 are at a greater rotation relative to each other than shown in FIG. 1.

The springs 32, 34 are stretched to a greater extent than shown in FIG. 1. Upon the cam 16 being moved in an opposite axial direction (towards the object space 30), the springs 32, 34 rotate the lenses 12, 14 back towards a position shown in FIG. 1. The lens followers 26, 28 follow the profile of the working cam surfaces 22, 24 as they rotate back towards a position shown in FIG. 1.

Figure 3:
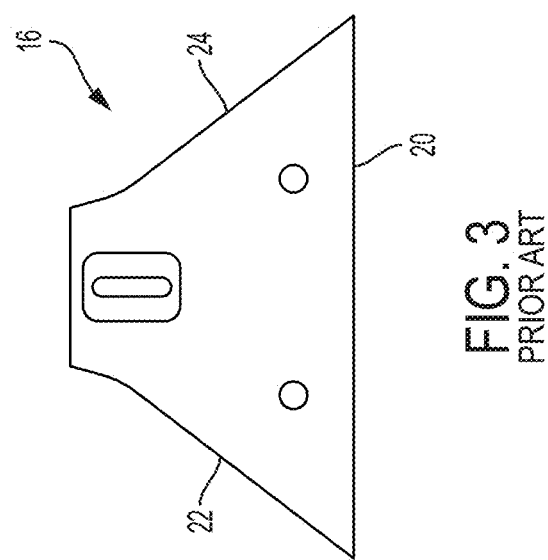
FIG. 3 illustrates a top view of the prior art cam that is shown in FIG. 1.

FIG. 3 illustrates a top view of the prior art cam 16 that is shown in FIGS. 1 and 2. The working cam surfaces 22, 24 are configured to only apply a force outward from the body 20 of the cam 16.

Figure 4:
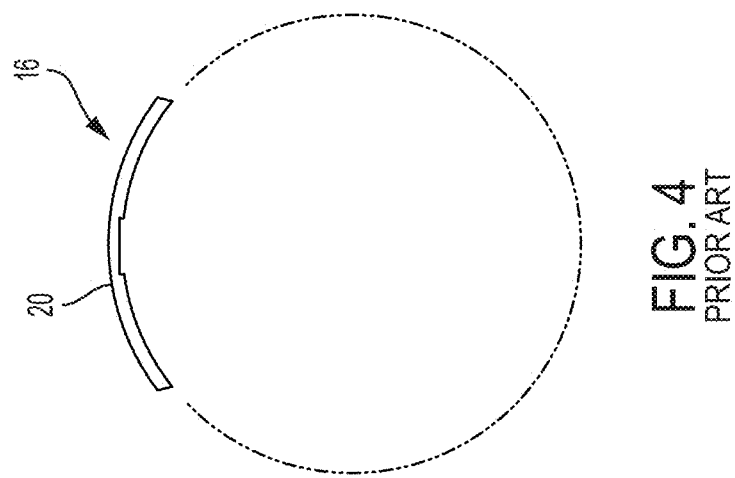
FIG. 4 illustrates a front view of the prior art cam that is shown in FIG. 1.

FIG. 4 illustrates a front view of the prior art cam 16, shown in relation to the lens system (marked in dashed lines). The prior art cam 16 has a curvature to accommodate the shape of the lens system.

The prior art lens system 10 suffers from a series of limitations. The use of the springs 32, 34 may lead to mechanical error and lack of precision. The springs 32, 34 may weaken over time or may become dislodged. The mechanical strength and resilience of the springs 32, 34 may also vary based on temperature. For example, cold weather affects the grease in the metal housings, used to lubricate the movement of the glass inside the housing. Temperature impacts the viscosity of the grease. Extreme temperatures may make the springs brittle or otherwise vary their strength. Variations in the strength of the springs 32, 34 over time may also lead to inconsistent control of the rotation of the lenses 12, 14. Further, the use of springs 32, 34 themselves may lead to inconsistent control because the resistive force of the springs 32, 34 may vary depending on the distance that the spring is stretched. The prior art lens system 10 also provides a limited range of focus, and particularly does not allow for close focus distances.

Figure 5:
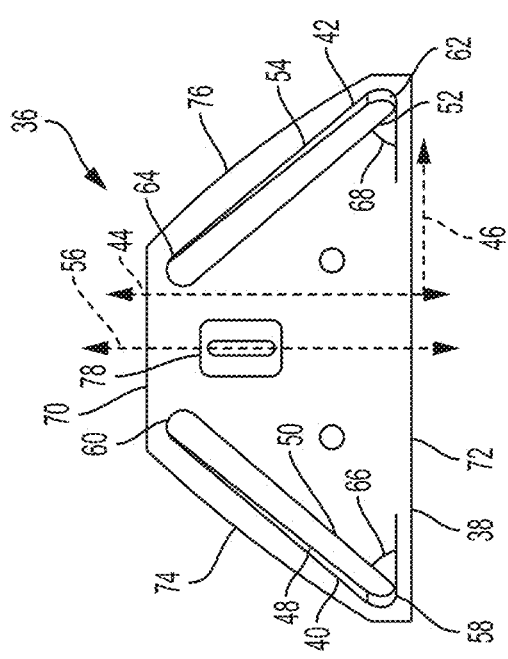
FIG. 5 illustrates a top view of a cam according to an embodiment of the present disclosure.

FIG. 5 illustrates a top view of a cam 36 according to the present disclosure. The cam 36 includes a body 38 and a plurality of slots 40, 42. The slots 40, 42 are each configured to receive a respective lens follower (shown in FIG. 8). The slots 40, 42 extend in directions that are convergent relative to each other. The slots 40, 42 extend in directions that are non-parallel relative to each other. The cam 36 may be for applying movement to a lens system.

The body 38 may include an axial dimension 44 and a lateral dimension 46. The axial dimension 44 is the dimension along the optical axis of the lens. The slots 40, 42, and particularly the respective working cam surfaces 48, 50, 52, 54 of the slots 40, 42, may be symmetrical with each other. The slots 40, 42 and respective working cam surfaces 48, 50, 52, 54 of the slots 40, 42 are symmetrical about a line of symmetry (marked as reference line 56). The line of symmetry 56 may extend along the axial dimension 44. The symmetry of the slots 40, 42 and respective working cam surfaces 48, 50, 52, 54 may allow each of the respective lens followers to follow an identical path. The slots 40, 42 may have an identical path length for the respective lens followers to follow. The slots 40, 42 may extend in directions that are convergent upon the line of symmetry 56.

The slots 40, 42 may each have respective end portions 58, 60, 62, 64. For reference, end portions 58 and 62 may be referred to as "first end portions" and end portions 60 and 64 may be referred to as "second end portions." Each of the slots 40, 42 may extend from the first end portions 58, 62 to the second end portions 60, 64 in directions that are convergent relative to each other. The slots 40, 42 are convergent as taken along the axial dimension 44. As is shown in FIG. 5, each of the slots 40, 42 may extend from the second end portions 60, 64 to the first end portions 58, 62 in directions that are divergent relative to each other.

The convergence of the slots 40, 42 towards each other results in the second end portions 60, 64 being closer to each other than the first end portions 58, 62 are to each other. A distance between the slots 40, 42 decreases taken along the axial dimension from the first end portions 58, 62 to the second end portions 60, 64, and increases taken along the axial dimension from the second end portions 60, 64 to the first end portions 58, 62.

The slots 40, 42 may be shaped such that an axial distance between lens followers retained therein remains the same, yet the lateral distance between the lens followers varies during axial movement of the cam 36. The lateral distance between the lens followers varies on the path of the respective slots 40, 42, as taken along the axial dimension. This allows the cam 36 to rotate the lenses coupled thereto.

The working cam surfaces 48, 50 of the slot 40 may extend parallel to each other and face opposite each other. The working cam surfaces 52, 54 of the slot 42 may extend parallel to each other. Each of the slots 40, 42 may be straight. The working cam surfaces 50, 52 may be configured to rotate lenses (marked in FIG. 9) in counter rotating directions, and the working cam surfaces 48, 54 may be configured to rotate the lenses in opposite counter rotating directions.

The slots 40, 42 may form a triangular shape, as shown in FIG. 5.

Each of the slots 40, 42 may extend at an angle relative to the axial dimension 44 and the lateral dimension 46. The first end portions 58, 62 may each extend at respective angles 66, 68 relative to the lateral dimension 46. The first slot 40 and second slot 42 may be angled towards each other. The first slot 40 and second slot 42 extend at opposite angles relative to each other.

The body 38 may have a leading edge 70, and trailing edge 72 and left and right side edges 74, 76. The edges 70, 72, 74, 76 together may form a trapezoidal shape for the body 38, and particularly an isosceles trapezoid shape as shown in FIG. 5.

The body 38 may comprise a plate. The body 38 may be configured to couple to a lens system.

The cam 36 may include a mount 78 for coupling the cam 36 to a lens system. The mount 78 may comprise apertures in the body 38 as shown in FIG. 5, or in other embodiments may comprise other forms of mounts such as screws, rivets, other forms of fasteners, or other mounts.

Figure 6:
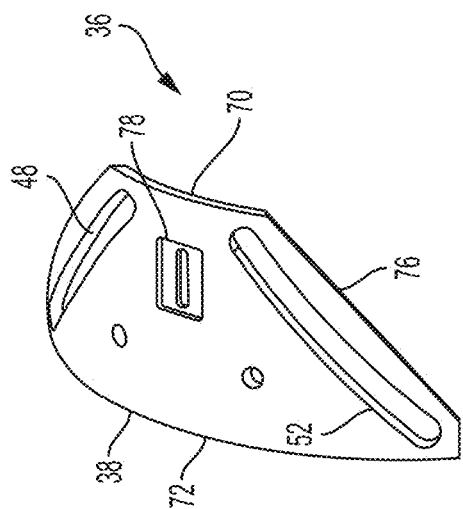
FIG. 6 illustrates a perspective view of the cam shown in FIG. 5.

FIG. 6 illustrates a side perspective view of the cam 36. The body 38 of the cam 36 may have a curvature as shown in FIG. 6.

Figure 7:
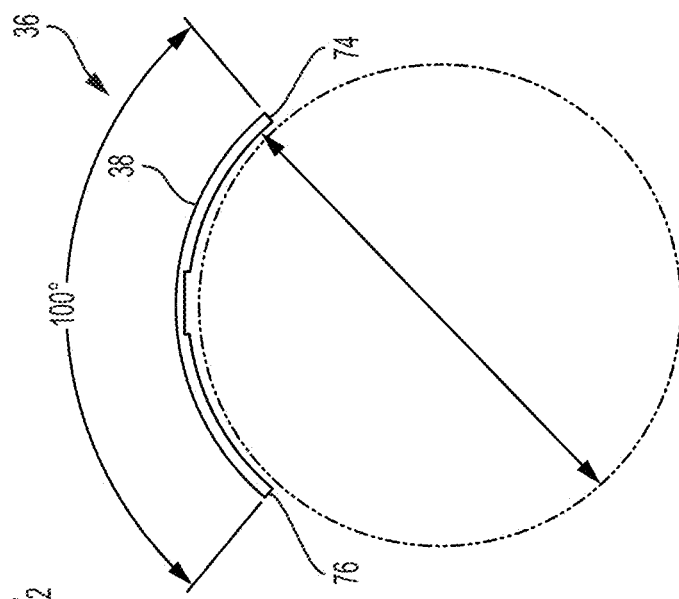
FIG. 7 illustrates a front view of the cam shown in FIG. 5.

FIG. 7 illustrates a front view of the cam 36. The body 38 of the cam 36 may have a curvature that matches the shape of the lens system. The body 38 of the cam 36 may curve about the optical axis. The body 38 from the left side edge 74 to the right side edge 76 may extend for about 100 degrees of the full circumference of the lens system. In one embodiment, the body 38 from the left side edge 74 to the right side edge 76 may extend for about 120 degrees of the full circumference of the lens system, which may comprise a longer focal length lens than the lens with the cam that extends for 100 degrees. In one embodiment, the body 38 from the left side edge 74 to the right side edge 76 may extend for about 115 degrees of the full circumference of the lens system.

Figure 8:
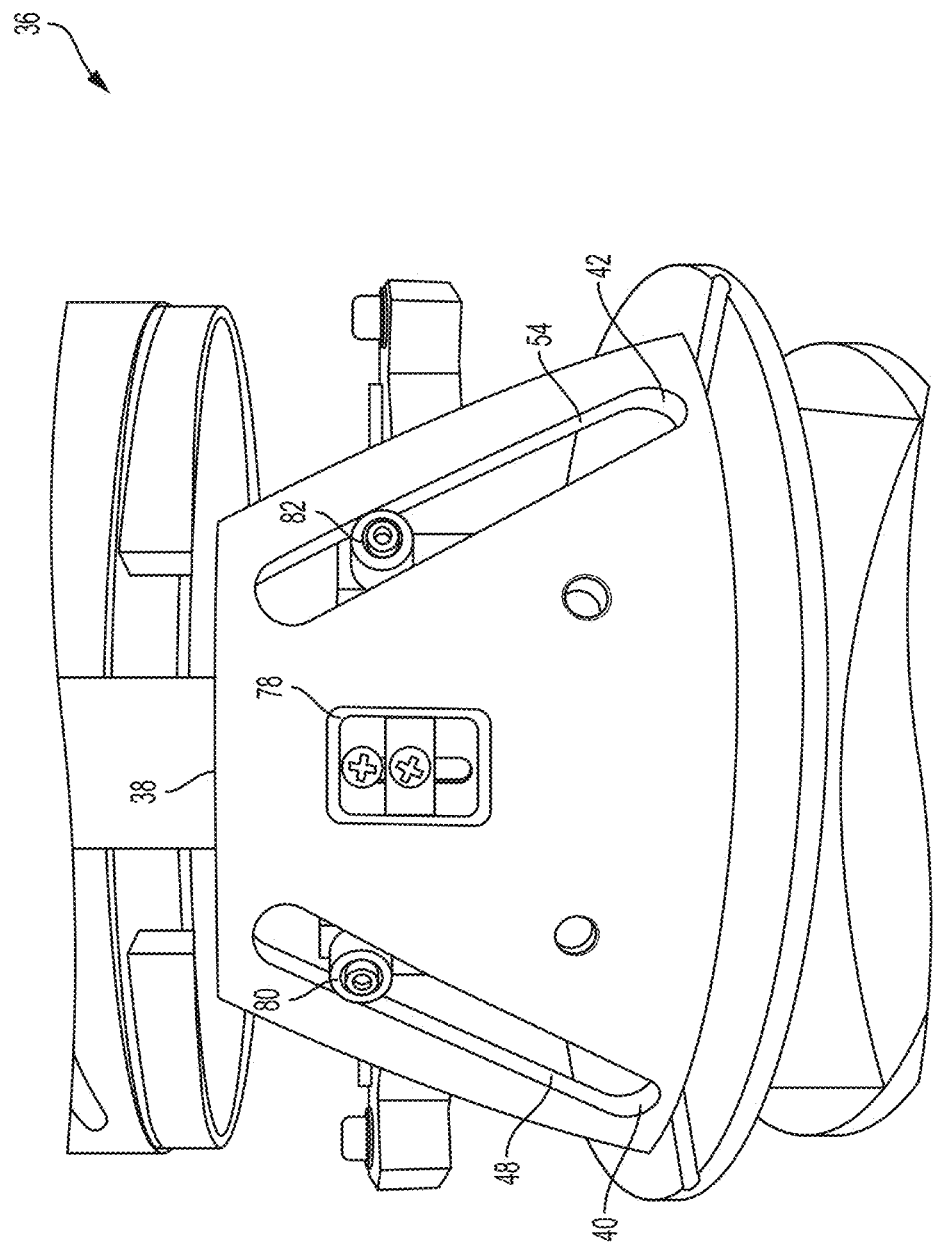
FIG. 8 illustrates a top view of the cam shown in FIG. 5 coupled to lens followers.

FIG. 8 illustrates a top view of the cam 36 coupled to lens followers 80, 82. The slots 40, 42 receive the respective lens followers 80, 82. The body 38 is coupled to the lens system via the mount 78. A support extends through an aperture of the mount 78 to couple the body 38 to the lens system.

The lens followers 80, 82 may each comprise rollers as shown in FIG. 8. In other embodiments other forms of lens followers 80, 82 such as knife-edge, flat-face, spherical-face, or other forms of followers may be utilized.

Figure 9:
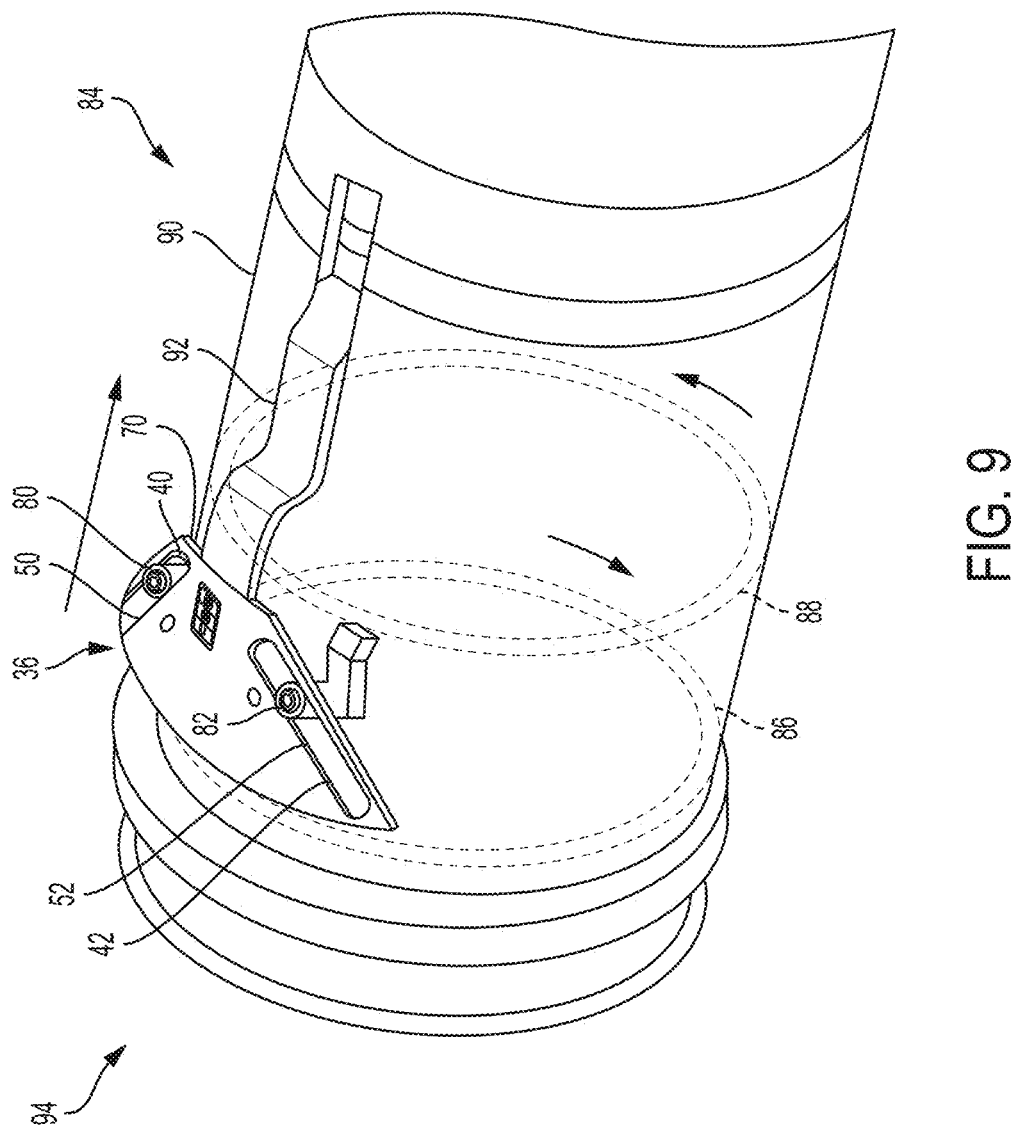
FIG. 9 illustrates a perspective view of a lens system including the cam shown in FIG. 5 according to an embodiment of the present disclosure.

FIG. 9 illustrates a lens system 84 including the cam 36 and lenses 86, 88. The lenses 86, 88 and cam 36 are coupled to a housing 90 of the lens system 84.

Similar to the prior art lens system 10, the lens system 84 may comprise an anamorphic lens system, and the lenses 86, 88 may each comprise cylindrical lenses. The anamorphic lens system may be designed to counter-rotate the lenses 86, 88 during focusing, to reduce optical aberrations, and particularly reduce astigmatism caused by the anamorphic lens system during focusing. The lenses 86, 88 may rotate in opposite directions from each other. The lenses 86, 88 may rotate equally in opposite directions and may be held concentric to the optical axis. In other embodiments, the cam 36 may be utilized in a lens system that is non-anamorphic. The lenses 86, 88 may be configured to be spherical lenses, or have another shape (e.g., aspheric) as desired. The lenses 86, 88 may be configured for non-anamorphic capture and the rotation of the lenses may produce desired optical effects. The optical effects may include light filtering, or a magnification, among other optical effects.

The cam 36 is coupled to the lens system via a slide support 92. The slide support 92 may have the form of an arm as shown in FIG. 9. The slide support 92 may allow the cam 36 to slide axially, along the optical axis. The axial movement may correspond to a focusing operation of the lens system 84. The slide support 92 may slide axially due to rotational movement of a support ring, which may be a focusing ring operated by a user. The slide support 92 may be coupled to a cam that drives the main movable focus group of the lens system.

Upon the cam 36 being moved axially in a direction away from the object space 94 (the space containing the objects or areas to be imaged), the inner working cam surfaces 50, 52 press against the respective lens followers 80, 82. The lens followers 80, 82 slide along the respective slot 40, 42. The forces against the lens followers 80, 82 rotate the lenses 86, 88 in opposite directions. The counter-rotation of the lenses 86, 88 reduces optical aberrations during focusing.

In one embodiment, the cam 36 may be oriented 180 degrees around from the position shown in FIG. 9 such that the leading edge 70 faces towards the object space 94. A similar operation of the cam 36 results. The orientation of the cam 36 may be provided based on the space available for the cam 36 in the lens system 84.

Figure 10:
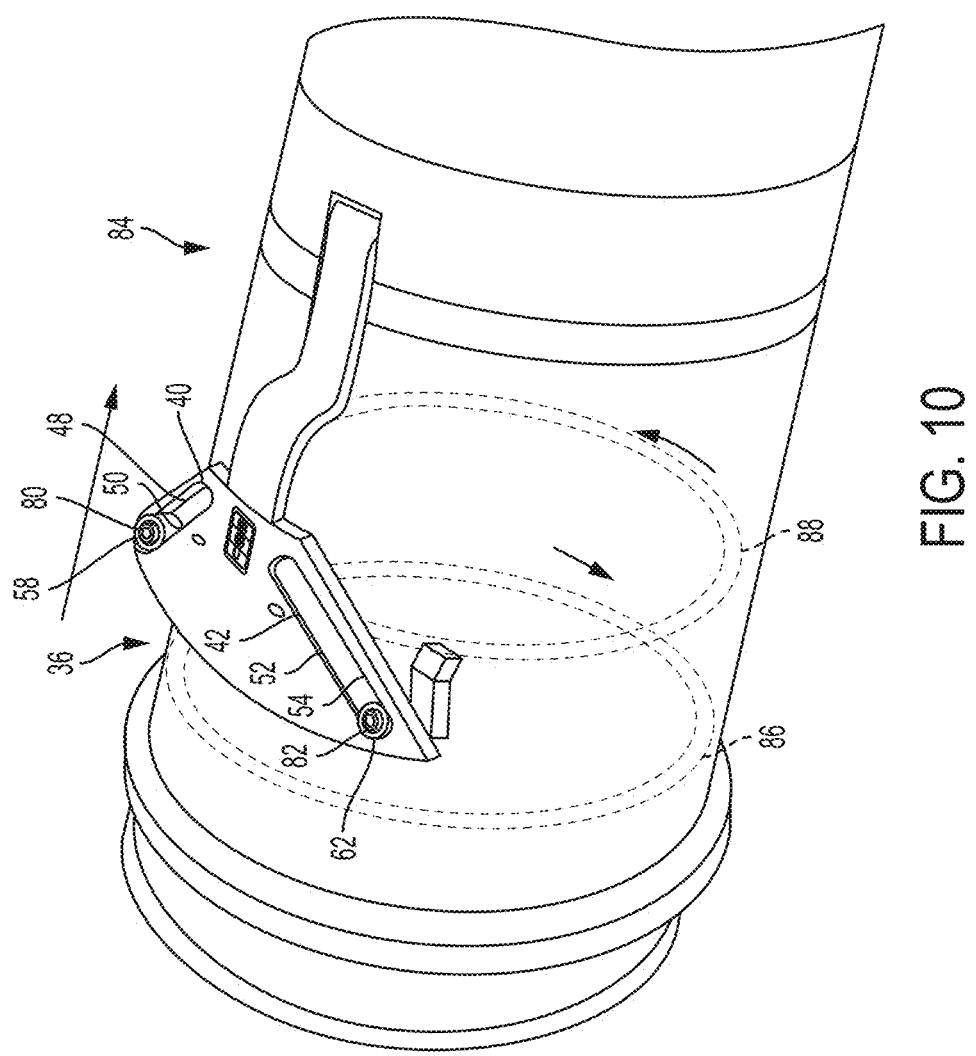
FIG. 10 illustrates a perspective view of a lens system including the cam shown in FIG. 5 according to an embodiment of the present disclosure.

FIG. 10 illustrates the lens system 84 in which the cam 36 has moved to its maximum axial position. The inner working cam surfaces 50, 52 have pressed the respective lens followers 80, 82 such that the lenses 86, 88 are at a greater rotation relative to each other than shown in FIG. 9. The lens followers 80, 82 have moved to the first end portions 58, 62 of the slots 40, 42.

The lens system 84 does not include springs to rotate the lenses 86, 88 in directions opposite those shown in FIGS. 9 and 10. Rather, the outer working cam surfaces 48, 54 are configured to press against the respective lens followers 80, 82 to apply a force to the lens followers 80, 82. The force from the outer working cam surfaces 48, 54 rotates the lenses 86, 88 in directions opposite those shown in FIGS. 9 and 10. The axial movement of the cam 36 accordingly causes the lenses 86, 88 to rotate in opposite directions from each other.

The cam 36 beneficially allows for the lenses 86, 88 to be counter-rotated in multiple directions due to the presence of the slots 40, 42. The slots 40, 42 allow each of the lens followers 80, 82 to be pushed and pulled without the use of springs, as discussed in regard to the prior art of FIGS. 1-4. The use of the slots 40, 42 reduces the mechanical error discussed in regard to the springs. The slots 40, 42 may also enhance the movement precision of the lens system 84, by allowing for specific working cam surface profiles to be utilized with the cam 36. Fewer mechanical parts may also be utilized. The slots 40, 42 may also increase the range of rotation of the lenses 86, 88, to improve the ability of the lenses 86, 88 to provide for near focus. A more consistent focus feel may be provided for the user.

Figure 11:
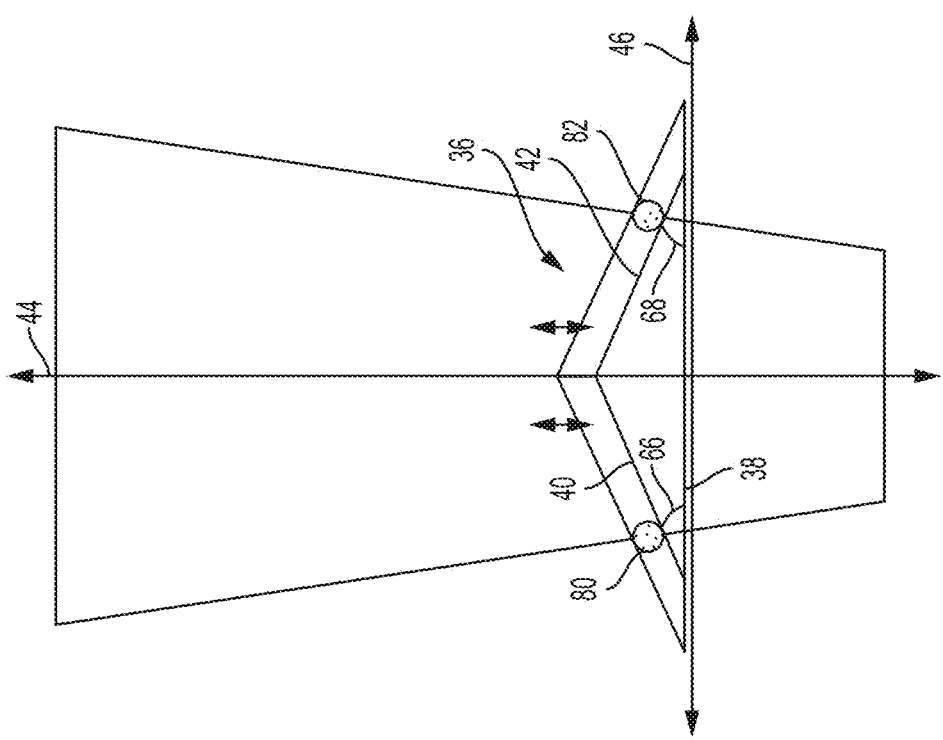
FIG. 11 illustrates a schematic representation of an operation of the cam shown in FIG. 5 according to an embodiment of the present disclosure.

FIG. 11 illustrates a schematic representation of the operation of the cam 36. The slots 40, 42 may extend at angles to the lateral dimension 46. The angles 66, 68 may extend between about 90 degrees to about 22 degrees. In one embodiment, the angles 66, 68 may be less than about 30 degrees. In other embodiments, the angles 66, 68 may be varied as desired. In one embodiment, the angles of the slots 40, 42 relative to the lateral dimension 46 may vary along the length of the respective slot 40, 42 between about 90 degrees to about 22 degrees. This may be an embodiment in which the slot 40, 42 shape may be non-linear. The angles 66, 68 may be determined based on the design of the lenses. The angles 66, 68 may be determined based on the requirements of each lens at various focal lengths. The angles 66, 68 may allow for greater control over the counter rotation of the lenses 86, 88.

Figure 12:
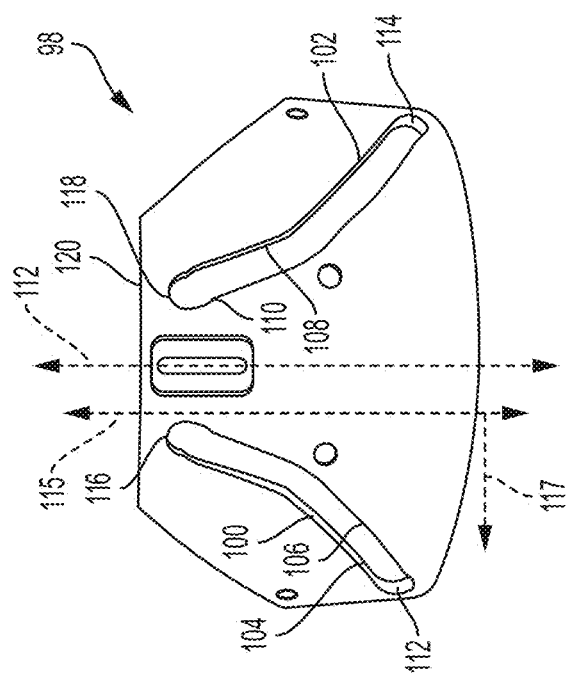
FIG. 12 illustrates a top view of a cam according to an embodiment of the present disclosure.

FIG. 12 illustrates a top view of an embodiment of a cam 98 having a different working cam surface profile than shown in FIGS. 5-10. The cam 98 includes slots 100, 102 having respective working cam surfaces 104, 106, 108, 110. The slots 100, 102 are each configured to receive a respective lens follower (similar to the slots 40, 42). The slots 100, 102 extend in directions that are convergent relative to each other. The slots 100, 102 extend in directions that are non-parallel relative to each other. The slots 100, 102 may have an identical path length for the respective lens followers to follow. The lateral distance between the lens followers varies on the path of the respective slots 100, 102 as taken along the axial dimension.

The slots 100, 102 and respective working cam surfaces 104, 106, 108, 110 of the slots 100, 102 are symmetrical about a line of symmetry (marked as reference line 112). The line of symmetry 112 extends along the axial dimension 115 (rather than the lateral dimension 117). The slots 100, 102 extend in directions that are convergent upon the line of symmetry 112.

Each of the slots 100, 102 has a non-linear shape. The respective working cam surfaces 104, 106, 108, 110 of the slots 100, 102 each have a contoured profile. The contoured profile may allow the lenses 86, 88 to rotate at varied rotation rates. For example, if a lens follower 80, 82 moves from a respective end portion 112, 114 to an opposite end portion 116, 118, then the lenses 86, 88 may initially rotate rapidly and then have their rate of rotation slow. This is because the rate of change of distance between the slots 100, 102 decreases along the axial dimension 115 from the end portions 112, 114 to an opposite end portion 116, 118 (towards the leading edge 120). The contour of the working cam surfaces may be configured to produce a desired rate of rotation for the respective lenses 86, 88. The shape of the slots and contour of the working cam surfaces may be varied than shown in FIG. 12. An optimized cam profile may be provided that the lenses may follow to achieve accurate results.

Figure 13:
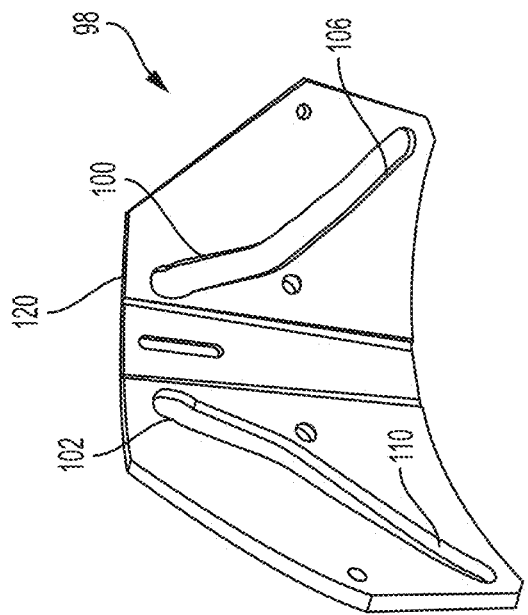
FIG. 13 illustrates a bottom perspective view of the cam shown in FIG. 12 according to an embodiment of the present disclosure.

FIG. 13 illustrates a bottom view of the cam 98.

Figure 14:
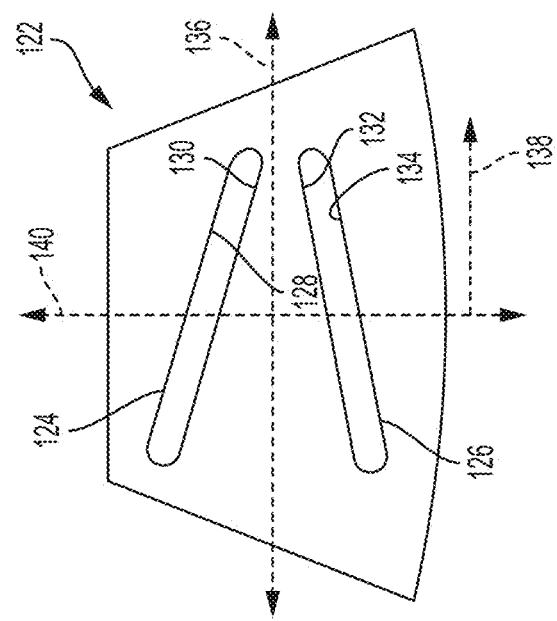
FIG. 14 illustrates a top view of a cam according to an embodiment of the present disclosure.

FIG. 14 illustrates a top view of an embodiment of a cam 122 having a different direction of slots 124, 126 than shown in FIGS. 5-10. The slots 124, 126 are each configured to receive a respective lens follower (similar to the slots 40, 42). The slots 124, 126 extend in directions that are convergent relative to each other. The slots 124, 126 extend in directions that are non-parallel relative to each other. The slots 124, 126 may have an identical path length for the respective lens followers to follow. The lateral distance between the lens followers varies on the path of the respective slots 124, 126 as taken along the axial dimension.

The slots 124, 126 and respective working cam surfaces 128, 130, 132, 134 of the slots 124, 126 are symmetrical about a line of symmetry (marked as reference line 136). The line of symmetry 136 extends along the lateral dimension 138 (rather than the axial dimension 140). The slots 124, 126 extend in directions that are convergent upon the line of symmetry 136.

Each of the slots 124, 126 is straight. The slots 124, 126 are shaped such that an axial distance between lens followers retained therein remains the same, yet the lateral distance between the lens followers varies during axial movement of the cam 122. This allows the cam 122 to rotate the lenses coupled thereto.

The embodiments of cams disclosed herein may be configured to be separable from the lens system. For example, a plurality of cams may be utilized and swapped out in the lens system to provide a desired movement of the lenses. Each of the plurality of lenses may have a different slot shape, to provide the desired movement of the lenses.

The embodiments of cams disclosed herein may be utilized in a system, including a lens system. The lens system may include lenses, as disclosed herein, and other components that may allow for imaging. In one embodiment, the lens system may comprise a lens group that is separable from a camera. The entire lens system may be separable from the camera and replaced to provide a desired optical image capture. In one embodiment, the cams disclosed herein may be utilized in a camera system including a digital image sensor or a film capture aperture, or the like. The camera system may be either a film capture system or a digital capture system. The camera system may be used in the motion picture industry, or other industries as desired. The camera system is not limited to moving picture capture, but may include still photography capture, or mobile device capture (e.g., smartphone cameras, camera phones, or the like).

Figure 15:
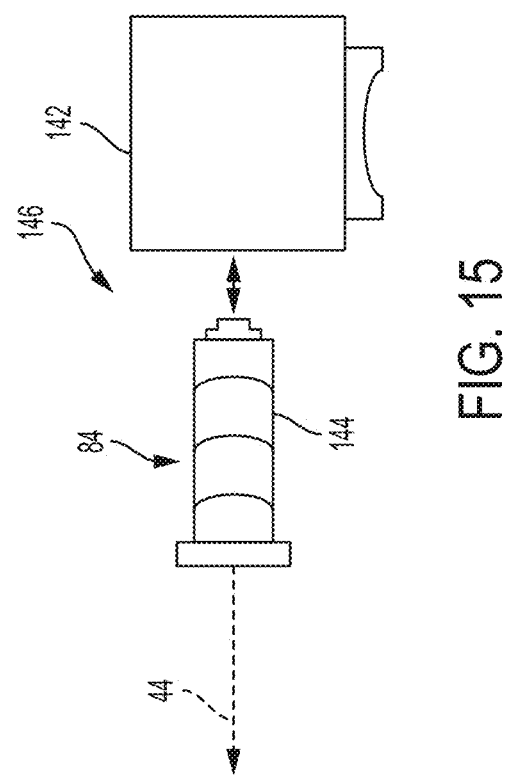
FIG. 15 illustrates a side view of a camera system according to an embodiment of the present disclosure.

FIG. 15 for example, illustrates an embodiment of the lens system 84 removably coupled to a camera 142. A housing cover 144 may cover the cam contained therein. The lens system 84 and camera 142 together may form a camera system 146. The camera 142 may be a film capture camera or a digital capture camera, or other forms of cameras. The camera system 146 may be configured to capture in an anamorphic or non-anamorphic capture mode.

The slots disclosed herein may comprise apertures extending entirely through the cam bodies as disclosed herein. In one embodiment, the slots may not comprise apertures, but may comprise grooves extending along the cam bodies.

The shape of the cam bodies disclosed herein may be modified to accommodate the shape of the lens system that the cam is coupled to. The cam bodies may be oriented at a rotation of 180 degrees from the orientation shown in this application, or may be put at another orientation, to produce a desired effect.

The present disclosure includes methods of rotating lenses using the cams disclosed herein. The present disclosure also includes methods of utilizing any of the cams, systems, or other structures disclosed herein. Any of the processes or steps disclosed herein may comprise a method within the scope of the present disclosure. For example, a method may include providing a cam including a first slot and a second slot, the first slot being coupled to a first lens and the second slot being coupled to a second lens such that axial movement of the cam causes the first lens and the second lens to rotate in opposite directions from each other. The method may include providing axial movement of the cam to rotate the first lens and the second lens in opposite directions from each other.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A method for moving a lens in a lens system used with a camera, the method comprising:
    moving a cam axially along an optical axis of the lens system, wherein the cam is positioned along an outer surface of the lens system, wherein the cam comprises a body having at least one slot;
    wherein at least one follower is slidably disposed in the at least one slot, wherein the at least one follower is connected to at least one lens of the lens system, and wherein during the step of moving the cam the follower moves in the slot and causes the lens to move in the lens system.

2. The method of claim 1, wherein the step of moving the cam causes the lens to be rotated in the lens system.

3. The method of claim 1, wherein the lens system comprises two lenses each connected to respective followers that are connected to respective slots, wherein moving the cam causes the two lenses to be moved simultaneously in the lens system.

4. The method of claim 3, wherein the slots each have an elongated configuration and are each arranged departing in opposite directions from one another.

5. The method of claim 3, wherein during the step of moving, the two lenses are rotated in opposite directions.

6. The method of claim 1, wherein the at least one slot has an elongated configuration, and wherein during the step of moving, the at least one follower moves in the slot between opposed closed ends of the slot.

7. The method of claim 1, wherein during the step of moving, the cam body remains coupled to the camera lens system.

8. The method of claim 1, wherein during the step of moving, the cam body is configured to move axially relative to the lens system along the optical axis of the lens system.

9. A camera lens system for use with a camera comprising:
    a cam having a body that is coupled to an outer portion of the lens system;
    one or more lenses disposed in the lens system; and
    one or more followers each coupled at one end to one lens and at the other end dispose within a slot of the cam body;
    wherein axial movement of the cam body along an optical axis of the lens system causes the one or more followers to move within a respective cam body slot and cause a respective lens connected with the one or more followers to move.

10. The camera lens system of claim 9, wherein the slot has an elongated configuration, and wherein movement of the follower in the slot causes the lens connected to the follower to rotate.

11. The camera lens system of claim 9, wherein the cam body comprises two elongated slots, wherein there are two lenses disposed in the lens system, and wherein there are two followers each of which having one end disposed in a respective slot and an opposite end connected to a respective lens.

12. The camera lens system of claim 9, wherein the slots each have an elongated configuration and are each arranged departing in opposite directions from one another.

13. The camera lens system of claim 11, wherein axial movement of the cam body causes the followers to move along respective slots and cause the lenses connected to the followers to be simultaneously rotated.

14. The camera lens system of claim 11, wherein movement of the followers in the cam body slots causes the lenses to be rotated in opposite directions from one another.

15. The camera lens system of claim 9, wherein the cam body is configured to move axially relative to the lens system along the optical axis of the lens system.

16. A camera system comprising a camera and a lens system connected thereto, wherein the lens system comprises a cam having a body coupled to the lens system, wherein the cam body includes elongated slots, wherein one end of a follower is disposed in each of the slots and an opposite end of each follower is connected to a lens of the lens system, wherein axial movement of the cam body along an optical axis of the lens system causes the followers to move along respective cam body slots and cause the respective lenses to be moved.

17. The camera system of claim 16, wherein the slots are configured to cause the respective lenses to be rotated by axial movement of the cam body.

18. The camera system of claim 16, wherein the lenses are rotated in opposite directions to one another.

19. The camera system of claim 16, wherein the slots each have an elongated configuration and are each arranged departing in opposite directions from one another.

20. The camera system of claim 16, wherein the cam body is configured to move axially relative to the lens system along the optical axis of the lens system.

* * * * *